US005657417A

United States Patent [19]
Di Troia

[11] Patent Number: 5,657,417

[45] Date of Patent: Aug. 12, 1997

[54] CONTROL FOR BATTERY POWERED TOOL

[75] Inventor: Gary W. Di Troia, Nashua, N.H.

[73] Assignee: Burndy Corporation, Norwalk, Conn.

[21] Appl. No.: 432,688

[22] Filed: May 2, 1995

[51] Int. Cl.$^6$ .......................... G05B 5/00; B25B 23/147; F16D 31/02

[52] U.S. Cl. .......................... 388/829; 388/921; 388/937; 60/452; 173/148; 173/176; 307/139; 361/23

[58] Field of Search .................................... 318/138, 434, 318/245, 430, 254, 257, 268, 283; 388/831, 817, 825, 826, 827, 828, 829, 838, 839, 937; 60/452; 417/219; 173/148, 2, 20, 109, 176; 140/122, 124

[56] References Cited

U.S. PATENT DOCUMENTS

| | | | |
|---|---|---|---|
| 3,590,582 | 7/1971 | German | 60/57 |
| 4,013,895 | 3/1977 | Akiyoshi et al. | 307/126 |
| 4,292,585 | 9/1981 | Charette | 324/51 |
| 4,394,612 | 7/1983 | Emerle et al. | 320/31 |
| 4,460,870 | 7/1984 | Finger | 324/429 |
| 4,607,932 | 8/1986 | Egawa et al. | 354/468 |
| 4,645,942 | 2/1987 | Nilssen | 307/140 |
| 4,739,435 | 4/1988 | Nothofer | 361/23 |
| 4,794,273 | 12/1988 | McCullough et al. | 307/139 |
| 4,893,067 | 1/1990 | Bhagwat et al. | 388/817 |
| 4,951,171 | 8/1990 | Tran et al. | 361/90 |
| 5,119,011 | 6/1992 | Lambert | 320/43 |
| 5,193,048 | 3/1993 | Kaufman et al. | 361/232 |
| 5,195,042 | 3/1993 | Ferraro et al. | 364/468 |
| 5,198,793 | 3/1993 | Leveque | 338/172 |
| 5,217,273 | 6/1993 | Hendricsen et al. | 294/64.1 |
| 5,250,891 | 10/1993 | Glasgow | 320/31 |
| 5,265,254 | 11/1993 | Blasciak et al. | 395/700 |
| 5,277,261 | 1/1994 | Sakoh | 173/176 |
| 5,289,885 | 3/1994 | Sakoh | 173/2 |
| 5,293,156 | 3/1994 | Shoji et al. | 340/636 |
| 5,321,309 | 6/1994 | Kolomyski | 307/10.8 |
| 5,458,159 | 10/1995 | Kilmer | 140/122 |
| 5,477,680 | 12/1995 | Heskey et al. | 60/452 |
| 5,526,460 | 6/1996 | DeFrancesco et al. | 388/831 |

*Primary Examiner*—Paul Ip
*Attorney, Agent, or Firm*—Perman & Green, LLP

[57] ABSTRACT

A tool with a battery, an electrical motor, and a control system. The control system has a trigger control that connects the battery to a timer and a voltage monitor. The trigger control has a user actuated switch and a timer actuated switch. At the end of a tool operational cycle, when the user is not actuating the user actuated switch, the timer actuated switch can supply electricity to the control system. After a predetermined period of time, the timer actuated switch can then automatically electrically disconnect the control system from the battery to conserve battery power.

20 Claims, 4 Drawing Sheets

CONTROL FOR BATTERY POWERED TOOL

BACKGROUND OF THE INVENTION

1. Field of the Invention

The present invention relates to a battery powered tool and, more particularly, to a control for a battery powered tool.

2. Prior Art

U.S. Pat. Nos. 5,113,679; 5,152,162; and 5,195,042 disclose a hydraulic compression tool with an electronic controller, batteries, signal lights, a hydraulic system pressure sensor, and a system for deactivating pumping effect of a pump when a predetermined hydraulic system pressure is reached. Huskie Tools Inc. of Glendale Heights, Ill. sells a portable, hand-held automatic cable crimper sold under the trademark ROBO*CRIMP that uses replaceable, rechargeable battery cartridges. An LED battery power level indicator flashes when five compression cycles remain. Other relevant art includes the following U.S. Pat. Nos.: 2,998,590; 4,300,282; 4,597,158; 4,914,941; 4,932,237; and 4,956,992.

SUMMARY OF THE INVENTION

In accordance with one embodiment of the present invention, a battery powered tool is provided having a battery, an electric motor, and a control system. The control system comprises a timer, a voltage monitor, and a trigger control. The trigger control connects the battery to the voltage monitor and the timer. The trigger control comprises the sole path of electricity from the battery to the voltage monitor and the timer. The trigger control has a user actuated switch. The control system also has means for supplying electricity to the timer independent from the user actuated switch. The means for supplying electricity is adapted to supply electricity to the timer for a limited period of time after activation of the timer. When the user actuated switch is not being actuated by a user, and upon the end of the limited period of time, supply of electricity to the timer and the voltage monitor is stopped by the trigger control.

In accordance with another embodiment of the present invention, in a battery operated tool having a battery, an electric motor, and a control system, the improvement comprises an electrical connection section for electrically connecting and disconnecting the control system to the battery. The connection section has a first user actuated switch and a second timer actuated switch. The second timer actuated switch is controlled by a timer of the control system. The electrical connection section deactuates the second timer actuated switch to disconnect the timer from the battery through the second timer actuated switch a predetermined period of time after a predetermined event.

In accordance with one method of the present invention, a method of controlling supply of electricity from a battery to circuitry of a battery operated tool is provided. The method comprises steps of transmitting a signal from a timer of the circuitry to a timer control switch upon an occurrence of a predetermined event; moving the timer control switch to a first position to electrically connect at least a portion of the circuitry to a battery of the tool through the timer controlled switch upon receipt of the signal by the timer controlled switch from the timer; and moving the timer controlled switch to a second position to electrically disconnect the portion of the circuitry from the battery through the timer controlled circuit, a predetermined period of time after the predetermined event, the electrical disconnection including electrical disconnection of the timer from the battery.

In accordance with another method of the present invention, a method of operating a battery powered tool is provided comprising steps of actuating a first switch by a user to supply electricity from a battery of the tool to circuitry of the tool; automatically actuating a second switch in response to a predetermined event and only after the first switch has been actuated by the user to establish an electrical path between the battery and the circuitry that is electrically parallel to the first switch; and automatically deactuating the second switch a predetermined period of time after the predetermined event.

In accordance with another embodiment of the present invention, in a battery powered tool having an electric motor and a battery, the improvement comprises a control having a timer, a voltage monitor, and means for controlling operation of the tool based upon an output of the timer and an output of the voltage monitor.

In accordance with another method of the present invention, a method of controlling a battery powered tool is provided comprising steps of determining voltage of a battery of the tool by a voltage monitor of the tool at a start of a tool operational cycle; and controlling operation of the tool after the start of the tool operational cycle without regard to the voltage monitor when the voltage monitor has monitored that there is sufficient voltage in the battery at the start of the tool operational cycle to complete a full tool operational cycle.

BRIEF DESCRIPTION OF THE DRAWINGS

The foregoing aspects and other features of the invention are explained in the following description, taken in connection with the accompanying drawings, wherein.

DETAILED DESCRIPTION OF THE PREFERRED EMBODIMENT

Figure 1:
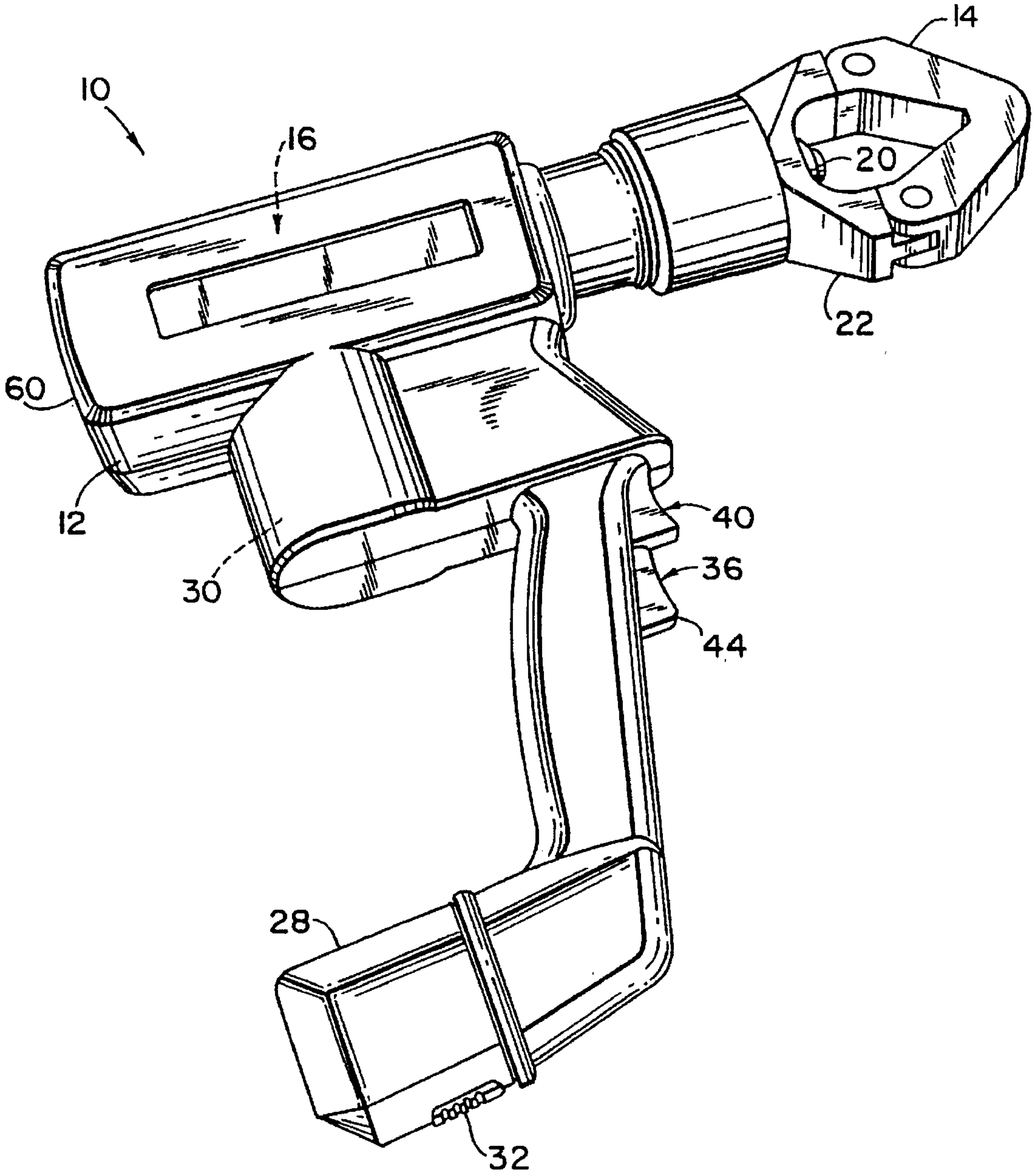
FIG. 1 is a perspective view of a crimping tool incorporating features of the present invention.

Referring to FIG. 1 there is shown a perspective view of a tool 10 for crimping an electrical connector onto a wire. Although features of the present invention will be described with reference to the single embodiment shown in the drawings, it should be understood that features of the present invention can be embodied in various different types of alternate embodiments. In addition, any suitable size, shape, or type of materials or elements can be used.

Figure 2:
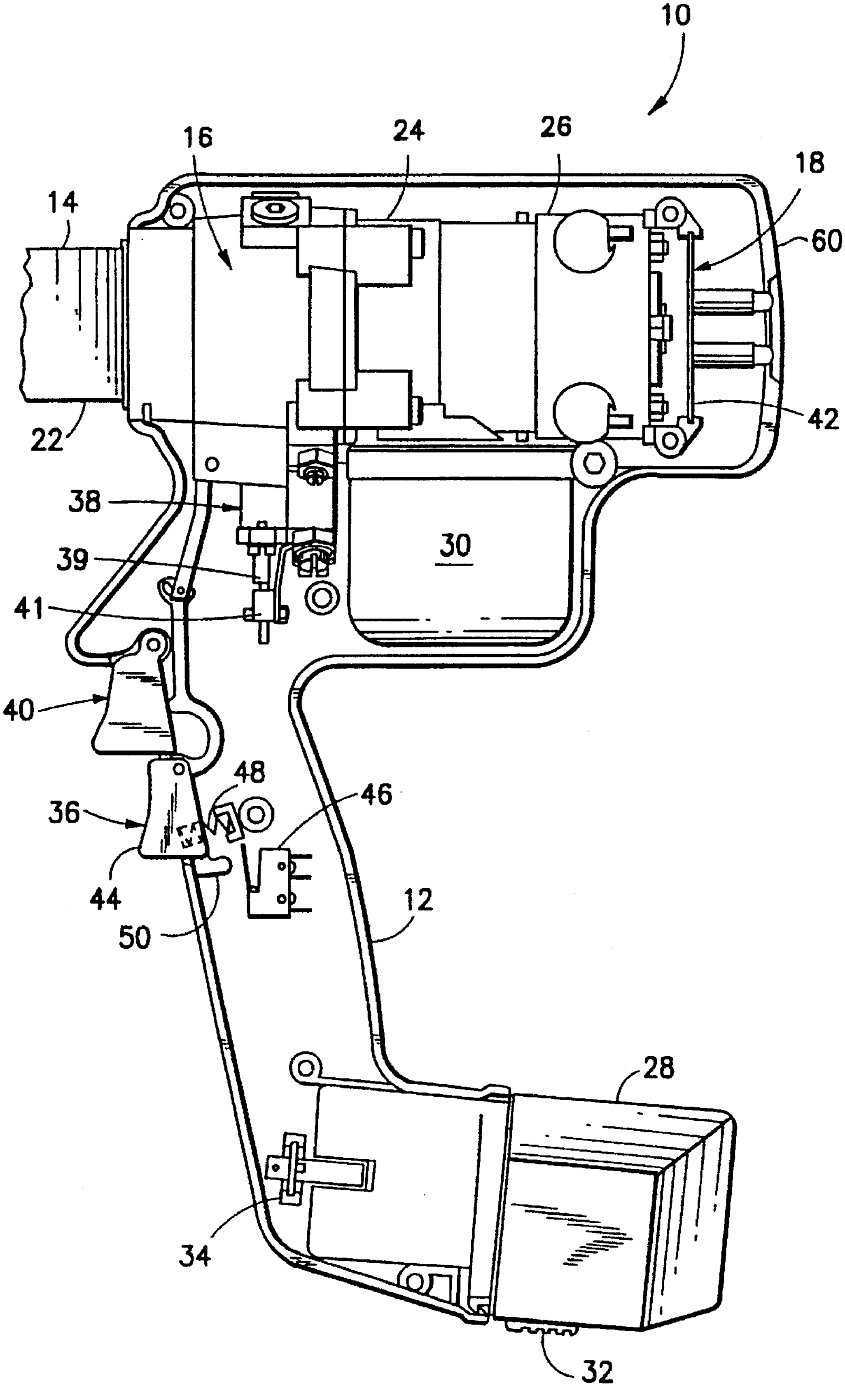
FIG. 2 is a schematic sectional view of the body of the tool shown in FIG. 1.

Referring also to FIG. 2, the tool 10 generally comprises a housing 12, a compression head 14, a drive system 16, and a control system 18. The compression head 14 is a well known part of crimping tools and includes a spring loaded ram 20 and a frame 22 that forms an anvil section for the ram. However, any suitable compression head could be provided. Removable crimping dies could also be provided. A similar tool is disclosed in U.S. patent application No. 08/224,825, now U.S. Pat. No. 5,553,478 which is hereby incorporated by reference in its entirely.

The drive system 16 generally comprises a hydraulic pressure system with a pump 24, an electric motor 26, and a battery 28. The use of a hydraulic pressure system to move a ram is generally known in the art as seen by U.S. Pat. No. 5,113,679 which is hereby incorporated by reference in its entirety. Instead of the manually actuated pump disclosed in U.S. Pat. No. 5,113,679, the tool 10 uses the motor driven pump 24. In a preferred embodiment the pump 24 is a five radial piston, self-regulating variable capacity, direct drive micro-hydraulic pump manufactured by Hydro Rene Leduc of France. One type of radial piston pump that could be used is disclosed in pending U.S. patent application No. 08/305,144 which is hereby incorporated by reference in its entirety. However, other types of pumps could be used. The hydraulic system includes a pressurized hydraulic reservoir 30 that the pump 24 can receive hydraulic fluid from and, which can receive hydraulic fluid from the compression head 14 as the ram 20 is being retracted. In the embodiment shown, the motor 26 is a high performance rare earth element permanent magnet motor manufactured by G.E.C.-Alsthom. However, in alternate embodiments, other types of motors could be used. The motor 26 is directly connected to the pump 24 without a gear transmission. The battery 28, in the embodiment shown, is a 12 volt removable rechargeable Nickel-Cadmium battery made from ten sub-C cells yielding 1.7 amp-hours of charge. However, in alternate embodiments, other types of batteries or power sources could be used. The battery 28 has a latch 32 for snap latching and removing the battery from connection with the housing 12. Located inside the housing 12 is a battery terminal 34 for making electrical connection with a connected battery.

Figure 3:
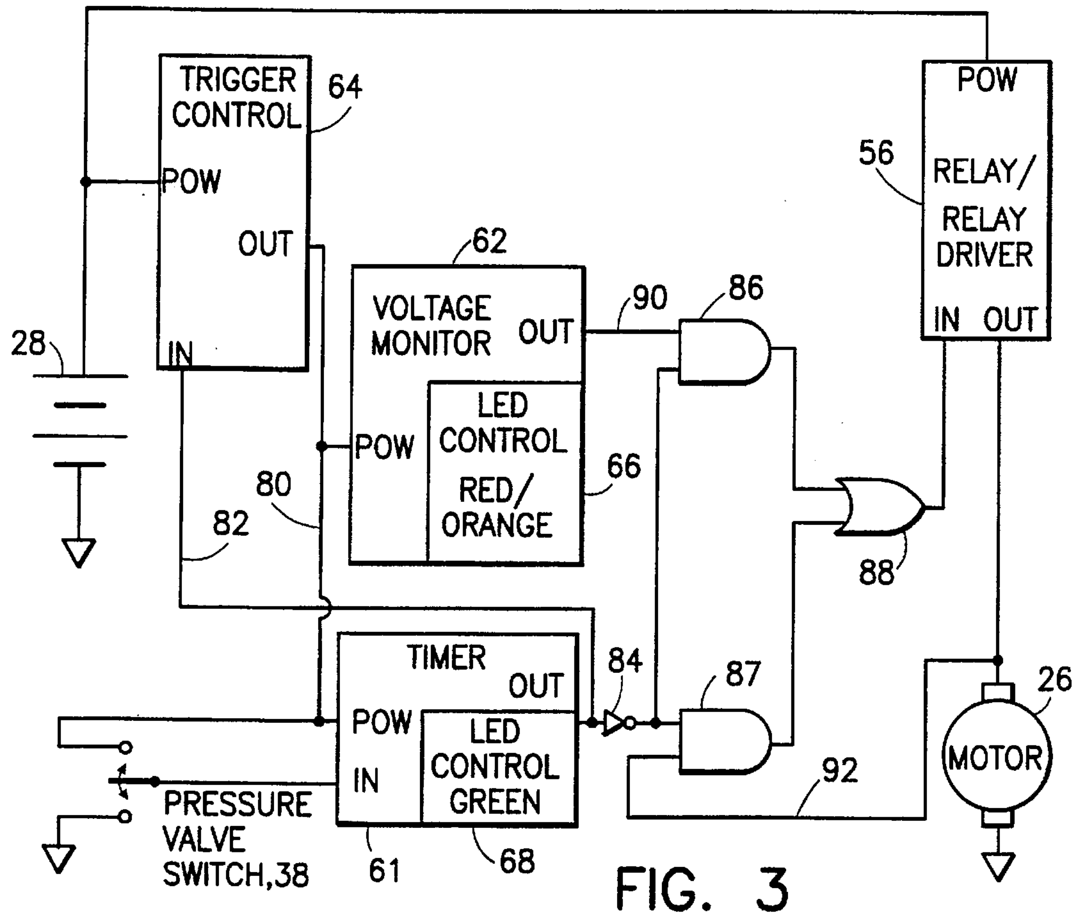
FIG. 3 is a schematic diagram of the electrical system of the tool shown in FIG. 1.

The control system 18 generally comprises an activation trigger 36, a hydraulic system pressure switch or sensor 38, a release trigger 40, and a printed circuit board 42. The activation trigger 36 generally comprises a trigger member 44 and a microswitch 46. The trigger member 44 is pivotably mounted to the housing 12. A spring 48 is used to bias the trigger member 44 in a forward position. The trigger member 44 has a section 50 adapted to activate the microswitch 46 when the trigger member 44 is depressed by a user. The pressure sensor 38 is similar to the pressure sensor described in U.S. Pat. No. 5,113,679 with a spring loaded plunger 39 and a microswitch 41. When the hydraulic system pressure reaches a predetermined pressure, such as about 12,000 psi, the plunger 39 is moved by the hydraulic fluid. The spring (not shown) is compressed and the microswitch 41 is activated. Referring also to FIG. 3, a schematic diagram of the electrical system is shown. The printed circuit board 42 generally comprises a timer 61, a voltage monitor 62, a portion of the trigger control 64, a relay 56, and two LEDs 58, 59. The first LED 58 is a red/orange LED. The first LED 58 is connected to and controlled by an LED control 66 of the voltage monitor 62. The second LED 59 is a green LED. The second LED 59 is connected to and controlled by an LED control 68 of the timer 61. The electrical system can selectively light the two LEDs. The LEDs project out apertures at a rear end or face 60 of the housing 12. The relay 56, in the embodiment shown, is mounted on the board 42. The relay 56 is preferably a coil relay. The relay 56 is operably connected between the motor 26 and battery 28 to function as a switch for turning the motor 26 ON and OFF.

Figure 4:
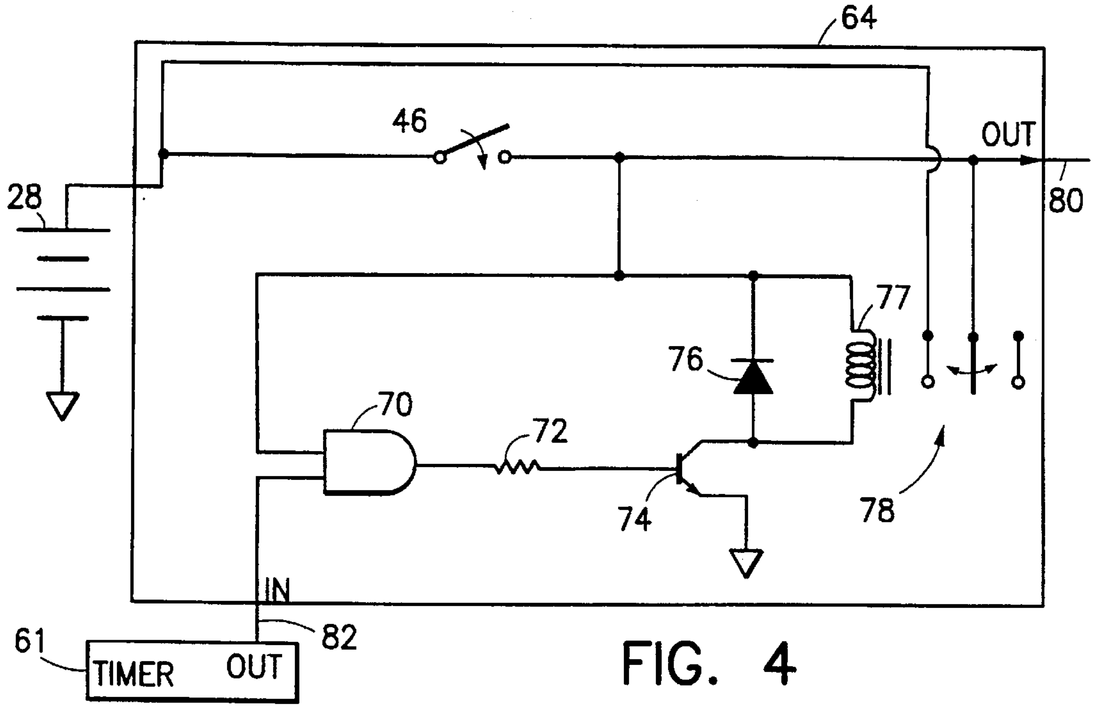
FIG. 4 is a schematic diagram of the trigger control shown in FIG. 3.

Referring also to FIG. 4, the trigger control 64 includes the switch 46 and circuitry on the printed circuit board 42. The circuitry includes an AND gate 70, a resistor 72, a transistor 74, a diode 76, a coil 77, and a switch 78. The battery 28 is connected to terminals of the two switches 46, 78. An out line 80 extends from the trigger control 64 to power inputs POW of both the voltage monitor 62 and timer 61. An out line 82 from the timer 61 extends to the input IN of the trigger control 64 and to an input of the AND gate 70. One terminal of the pressure switch 38 is connected to the out line 80 of the trigger control 64 and another terminal is connected to the input IN of the timer 61. Circuitry on the printed circuit board 42 also includes an inverter 84, two AND gates 86, 87, and an OR gate 88. The out line 82 from the timer 61 is connected to inputs of the two AND gates 86, 87 through the inverter 84. An out line 90 from the voltage monitor 62 extends to an input of the AND gate 86. An out line 92 from the relay 56 extends to an input of the AND gate 87. Both AND gates 86, 87 are connected to an input IN of the relay 56 by means of the OR gate 88.

The circuitry 52 is suitably configured to monitor or sense the voltage of the battery 28, to sense the activation of trigger 36 and sensor 38, and control energization of the coil of the relay 56 based upon the sensed voltage of the battery 28 and the status of the trigger 36 and sensor 38.

Figure 5:
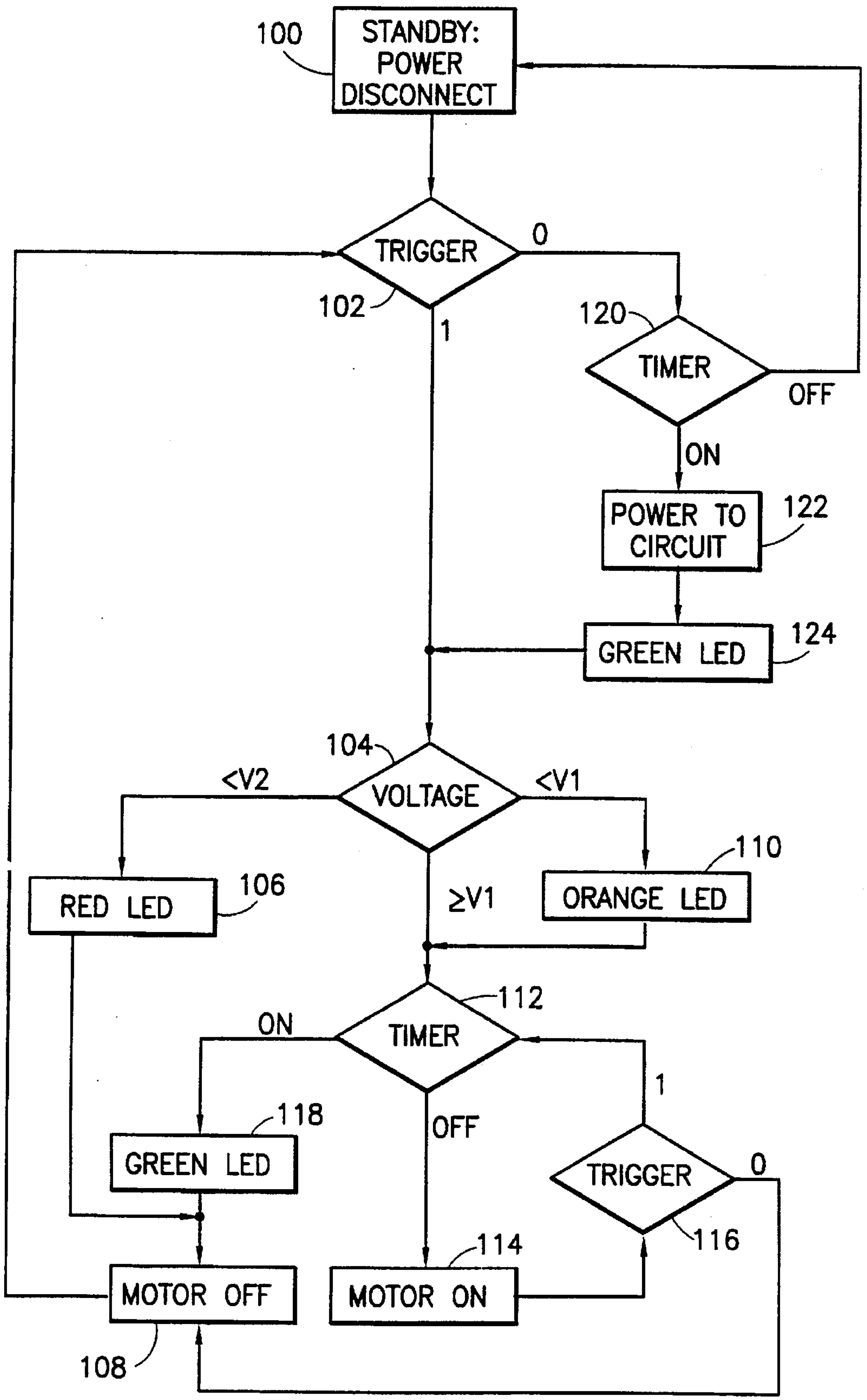
FIG. 5 is flow chart of tool operation and control of the tool shown in FIG. 1.

Referring also to FIG. 5, operation of the tool and the control system will be described. When not in use, as illustrated by box 100, and when the timer 61 is off, the tool is in a standby mode with power disconnected from the printed circuit board 42. No power is supplied because both switches 46 and 78, and a switch in relay 56 are open. When the trigger 36 is actuated by the user, as illustrated by output 1 of box 102, the switch 46 is closed. This outputs power on line 80 from the trigger control 64 to the timer 61, the voltage control 62 and the pressure valve switch 38. Voltage of the battery 28 is measured by the voltage monitor 62 as illustrated by box 104. If the voltage is less than a predetermined inadequate low voltage level V2, such as about 8.75 volts, the voltage monitor 62 will turn the first LED 58 ON to the color red as illustrated by box 106 and, keep the motor 26 OFF as illustrated by box 108. As used herein, the term "predetermined inadequate low voltage level" is intended to mean a battery voltage level that can still drive the motor, but is insufficient to allow a good crimp to be made. In other words, the power in the battery is insufficient to drive the motor to obtain compression at the compression head to the predetermined pressure, such as about 12,000 psi. If the tool did operate at this predetermined inadequate low voltage level, there is a good likelihood that a bad crimp or insufficient crimp would occur. The present invention, prevents the tool from even starting a crimp cycle if there is a good likelihood that a good crimp cannot be made with the available power in the battery 28. In addition, the red light from the first LED 58 clearly indicates or signals the user that the reason why the tool is not operating is because of the low voltage level in the battery 28.

If the sensed battery voltage is above the predetermined inadequate low voltage level, but less than a preferred minimum voltage level V1, such as about 9.0 volts, the circuitry 52 will turn the first LED 58 ON to the color orange, as illustrated by box 110, but otherwise proceed with its normal operation. As used herein, the term "preferred minimum voltage level" is intended to mean a battery voltage level near the predetermined inadequate low voltage level. Thus, the first LED 58 being lit orange functions as a warning to the user that the battery voltage is approaching the predetermined inadequate low voltage level, but is not that low yet. In a preferred embodiment, the first LED 58 will first be lit orange when about five crimp cycles of the tool are left before the predetermined inadequate low voltage will be reached.

If the sensed battery voltage is greater than or equal to the preferred minimum voltage level V1, the LED control 66 does not light the first LED 58. The voltage monitor outputs a signal to the AND gate 86 if the sensed battery voltage is greater than or equal to V2. The voltage monitor has no further influence on control of the tool during the tool operational cycle as further described below. The timer 61, assuming the pressure valve switch 38 has not been actuated, does not output a signal on line 82. The inverter 84, however, sends a signal to the other input of the AND gate 86. The circuitry 84, 86, 87, 88 thus inputs a signal to the input IN of the relay 56 that actuates the relay 56 to start the motor 26, as illustrated by box 114. Because of the digital control loop through the AND gate 87, the OR gate 88 and the relay 56, the motor 26 continues to operate even if the battery voltage temporarily dips below the predetermined inadequate low voltage level V2. To intentionally stop the motor 26 prior to the end of a full operational cycle or full crimp, a user can release the trigger 44 as illustrated by box 116.

When a connector crimp has been completed, the pressure valve switch 38 is actuated. This sends a signal to the input IN of the timer 61. In response to this signal, the timer 61 is activated and outputs a signal on output line 82. As illustrated by box 118, when the timer 61 is activated, the LED control 68 turns the second LED 59 ON to the color green to thereby signal the user of the completion of a good crimp. Because of the inverter 84, the signal from the timer 61 is inverted to zero before it reaches the inputs to both AND gates 86, 87. Therefore, the output of both AND gates 86, 87 is zero. Thus, the relay 56 is deenergized and the motor 26 is stopped as illustrated by box 108. The user, upon noticing that the motor 26 has stopped, will release the trigger 44.

The circuitry 70, 72, 74, 76, 77, 78 of the trigger control 64 shown in FIG. 4 has been provided to temporarily and automatically bypass the switch 46 of the trigger 36. This temporary power supply through the switch 78 is for keeping the timer 61 operational until it has finished its predetermined timer sequence, such as about 4.5 seconds after the pressure valve switch 38 is actuated. The timer 61 keeps the motor 26 disabled and keeps the second LED 59 lit for this predetermined period of time. As seen in FIG. 5, with the trigger released and timer ON, as illustrated by box 120, power is supplied to the control circuit and the second LED 59 as illustrated by boxes 122 and 124.

As seen with reference to FIGS. 3 and 4, the signal on line 82 from the timer 61 is delivered to the input IN of the trigger control 64. This signal is delivered to one of the inputs of the AND gate 70. Because the switch 46 is closed when the pressure valve switch 38 and the timer 61 are activated, a signal is also present at the other input of the AND gate 70. Therefore, the circuitry 70, 72, 74, 76 energizes the coil 77 to close the switch 78. An electrical path is established through the switch 78 parallel to the switch 46. This path is only temporary. When the timer 61 completes its predetermined timer sequence, the signal on line 82 returns to zero, the coil is deenergized, and the switch 78 is opened. Therefore, after the predetermined period of time is over, the timer 61 and voltage monitor 62 are automatically shut off and no longer drain power from the battery 28. This feature yields improved battery life because the battery 28 will not have constant drain while inserted in the tool.

The control system described above has several features. It monitors or signals completion of the crimp cycle (by signalling that the maximum hydraulic system pressure has been reached) and automatically turns the motor OFF to conserve battery energy. Thus, more crimping operations will be able to be performed from a single battery charge due to energy conservation. The orange lighting of the first LED warns the user that only a certain number of crimping operations can be performed before the tool will stop operating. The control system monitors battery power and disables the motor if battery voltage is too low to produce a likely good crimp. Thus, bad crimps are prevented. In addition, because the control system prevents the battery from starting to run the motor when the voltage of the battery is reduced to the predetermined inadequate low voltage level, the battery is prevented from being totally drained. Therefore, the battery can be recharged quicker and have a longer total work life. The control system also signals the end of a crimp completion by turning ON the greed LED.

In an alternate embodiment, the predetermined inadequate low voltage level could be less than or more than 8.75 volts and, the preferred minimum voltage level could be more or less than 9.0 volts. A different type of hydraulic system sensor could be used. A different type of relay could be used. Other types of circuitry could also be used. Obviously, many different types of alternate embodiments could be devised from the above described features of the present invention. Features of the present invention could also be used in compression apparatus other than a connector crimping tool. The digital control provides noncontinuous monitoring of battery voltage, thus improving the tool's nonresponse to drastic voltage changes during motor start-up. The variable states of the motor, the voltage monitor, and the timer are monitored by the digital logic. Correct tool operating decisions are made based on the changing states of these variables. The present invention does not have a continuous trickle drain on the battery, but still allows electronic control after the trigger 44 is released. The switch 78 disconnects the battery from the control system a predetermined period of time, such as about 4.5 seconds, after a predetermined event, such as actuation of switch 38. However, any suitable predetermined period of time could be used and any suitable predetermined event could be used.

It should be understood that the foregoing description is only illustrative of the invention. Various alternatives and modifications can be devised by those skilled in the art without departing from the spirit of the invention. Accordingly, the present invention is intended to embrace all such alternatives, modifications and variances which fall within the scope of the appended claims.

What is claimed is:

1. A battery powered tool having a battery, an electric motor, and a control system, the control system comprising:

a timer;

a voltage monitor;

a trigger control connecting the battery to the voltage monitor and the timer, the trigger control having a user actuated switch for supplying electricity from the battery to the timer and the voltage monitor; and means independent from the user actuated switch for supplying electricity to the timer for a limited period of time after activation of the timer, wherein when the user actuate switch is not being actuated by a user and upon the end of the limited period of time, supply of electricity to the timer and the voltage monitor is stopped by the trigger control.

2. A tool as in claim 1 wherein the control system includes a relay connected to the battery having an input from the timer and the voltage monitor and an output to the electric motor.

3. A tool as in claim 2 wherein the control system includes an inverter, two AND gates and an OR gate between the relay and the timer and voltage monitor.

4. A tool as in claim 1 wherein the control system includes a pressure valve switch connected to an input of the timer.

5. A tool as in claim 1 wherein the tool is a connector crimping tool with a hydraulic pump operably connected to the electric motor.

6. In a battery operated hydraulic tool having a battery, an electric motor, a hydraulic pump operably connected to the electric motor, and a control system, the improvement comprising:

an electrical connection section for electrically connecting and disconnecting the control system to the battery, the connection system having a user actuated switch and a timer actuated switch, the timer actuated switch being controlled by a timer of the control system, the electrical connection section deactuating the timer actuated switch to disconnect the timer from the battery, through the timer actuated switch, a predetermined period of time after a predetermined event.

7. A tool as in claim 6 wherein the predetermined event is completion of a connector crimp that is signaled to the timer by a hydraulic system pressure switch.

8. A tool as in claim 6 wherein the control system further comprises a voltage monitor.

9. A tool as in claim 8 wherein the control system includes a power relay connected between the battery and the motor that is controlled, at least partially, by the voltage monitor.

10. A tool as in claim 6 wherein the control system includes a power relay connected between the battery and the motor that is controlled, at least partially, by the timer.

11. A method of controlling supply of electricity from a battery to circuitry of a battery operated tool, the method comprising steps of:

transmitting a signal from a timer of the circuitry to a timer controlled switch upon an occurrence of a predetermined event;

moving the timer controlled switch to a first position to electrically connect at least a portion of the circuitry to a battery of the tool through the timer controlled switch upon receipt of the signal by the timer controlled switch from the timer;

moving the timer controlled switch to a second position to electrically disconnect the portion of the circuitry from the battery through the timer controlled switch a predetermined period of time after the predetermined event, the electrical disconnection including electrical disconnection of the timer from the battery; and determining voltage of the battery by a voltage monitor of the tool at a start of a tool operational cycle and, when a predetermined voltage is determined, allowing an electrical motor of the tool to operate without regard to the voltage monitor for a remainder of the cycle.

12. A method as in claim 11 further comprising actuating a hydraulic system pressure switch of the tool to activate the timer to transmit the signal.

13. A method as in claim 11 wherein the step of moving the timer controlled switch to the second position electrically disconnects a voltage monitor from the battery.

14. A method of operating a battery powered tool comprising steps of:

actuating a first switch by a user to supply electricity from a battery of the tool to circuitry of the tool;

automatically actuating a second switch in response to a predetermined event, and only after the first switch has been actuated by the user, to establish an electrical path between the battery and the circuitry that is electrically parallel to the first switch, wherein the step of automatically actuating the second switch occurs when a timer is activated by a third switch that monitors a predetermined characteristic of the tool; and automatically deactuating the second switch a predetermined period of time after the predetermined event.

15. A method as in claim 14 wherein the activation of the timer stops an electric motor.

16. A method as in claim 14 wherein the step of automatically deactivating the second switch, when the first switch is not being actuated, stops drain of electricity from the battery by all of the circuitry of the tool.

17. In a battery powered tool having an electric motor and a battery, the improvement comprising:

a control having a timer, a voltage monitor, a user actuated switch, a timer controlled switch, and means for controlling operation of the tool based upon an output of the timer, an output of the voltage monitor and operational status of the motor being ON or OFF, wherein the output of the voltage monitor only effects the means for controlling at a start of a tool operational cycle, and the output of the timer only effects the means for controlling at an end of the tool operational cycle.

18. A tool as in claim 17 further comprising a hydraulic pump connected to the electric motor.

19. A tool as in claim 18 further comprising a hydraulic system pressure switch for signaling pressure of a hydraulic system of the tool of the timer.

20. A method of controlling a battery powered tool comprising steps of:

determining voltage of a battery of the tool by a voltage monitor of the tool at a start of a tool operational cycle; and controlling operation of the tool after the start of the tool operational cycle without regard to the voltage monitor when the voltage monitor has monitored that there is sufficient voltage in the battery at the start of the tool operational cycle to complete the tool operational cycle.

* * * * *